US011811546B2

(12) United States Patent
Mishra et al.

(10) Patent No.: US 11,811,546 B2
(45) Date of Patent: *Nov. 7, 2023

(54) SELECTIVE MULTICAST ETHERNET TAG EXTENSION FOR OPTIMAL SOURCE DRIVEN MULTICAST FORWARDING

(71) Applicant: Cisco Technology, Inc., San Jose, CA (US)

(72) Inventors: Mankamana Prasad Mishra, San Jose, CA (US); Ali Sajassi, San Ramon, CA (US); Ijsbrand Wijnands, Leuven (BE); Krishnaswamy Muddenahally Ananthamurthy, San Ramon, CA (US); Jayashree Subramanian, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/472,774

(22) Filed: Sep. 13, 2021

(65) Prior Publication Data

US 2022/0200814 A1    Jun. 23, 2022

Related U.S. Application Data

(63) Continuation of application No. 16/858,978, filed on Apr. 27, 2020, now Pat. No. 11,159,337.

(51) Int. Cl.
*H04L 12/18* (2006.01)
*H04L 12/46* (2006.01)
(Continued)

(52) U.S. Cl.
CPC ........ *H04L 12/185* (2013.01); *H04L 12/4641* (2013.01); *H04L 45/16* (2013.01);
(Continued)

(58) Field of Classification Search
None
See application file for complete search history.

(56) References Cited

U.S. PATENT DOCUMENTS

2018/0287946 A1* 10/2018 Nagarajan ........... H04L 12/1877
2019/0166407 A1   5/2019 Sajassi et al.
(Continued)

OTHER PUBLICATIONS

EANTC AG, "Interoperability Showcase", White Paper 2018, MPLS + SDN + NFV World @ Paris 2018, Jun. 30, 2018, v5, 40 pages.
(Continued)

*Primary Examiner* — Christine T Duong
(74) *Attorney, Agent, or Firm* — Edell, Shapiro & Finnan, LLC (57) ABSTRACT

A networking environment includes a first node and a second node configured as Ethernet Virtual Private Networking (EVPN) peers on an EVPN subnet that is coupled to a Layer 3 VPN over a core network. The first node receives a first multicast join request from a third node in the core network, the first multicast join request including a source address and multicast group address of a source of a multicast stream. The first node determines that the source address and the multicast group address for the source are behind the EVPN subnet at the second node. The first node sends to the second node, a control plane join request message that includes a receiver identifier that identifies the third node as a receiver of the multicast stream, the receiver identifier enabling the second node to forward the multicast stream directly into the core network to the third node.

16 Claims, 11 Drawing Sheets

(51) Int. Cl.
  *H04L 9/40* (2022.01)
  *H04L 45/74* (2022.01)
  *H04L 47/724* (2022.01)
  *H04L 45/16* (2022.01)

(52) U.S. Cl.
  CPC ............ *H04L 45/74* (2013.01); *H04L 47/724* (2013.01); *H04L 63/0272* (2013.01)

(56) References Cited

U.S. PATENT DOCUMENTS

| | | |
|---|---|---|
| 2020/0076767 A1 | 3/2020 | Venaas et al. |
| 2020/0092122 A1 | 3/2020 | Mishra et al. |
| 2021/0092045 A1 | 3/2021 | Nagarajan et al. |
| 2021/0297273 A1* | 9/2021 | Nagarajan ............... H04L 45/16 |

OTHER PUBLICATIONS

Vikram Nagarajan et al., "Day One: Deploying Optimized Multicast in EVPN/VXLAN", Juniper Networks, v1, Feb. 2020, 186 pages.
W. Lin et al., "EVPN Optimized Inter-Subnet Multicast (OISM) Forwarding, draft-lin-bess-evpn-irb-mcast-04", BESS, Internet Engineering Task Force (IETF), draft-lin-bess-evpn-irb-mcast-04, Oct. 24, 2017, 70 pages.
Daniel Merling et al., "An Overview of Bit Index Explicit Replication (BIER)", IETF Journal, Mar. 21, 2018, 9 pages.
IJ. Wijnands, Ed. et al., "Encapsulation for Bit Index Explicit Replication (BIER) in MPLS and Non-MPLS Networks", Internet Engineering Task Force (IETF), RFC 8296, Jan. 2018, 24 pages.
IJ. Wijnands, Ed., et al., "Multicast Using Bit Index Explicit Replication (BIER)", Internet Engineering Task Force (IETF), RFC 8279, Nov. 2017, 43 pages.
A. Sajassi, Ed. et al., "BGP MPLS-Based Ethernet VPN", Internet Engineering Task Force (IETF), RFC 7432, Feb. 2015, 56 pages.
BGP Help, "EVPN Type 6 (Selective Multicast Ethernet Tag Route) Explained", Jun. 3, 2017, http://bgphelp.com/2017/06/03/evpn-type-6-selective-multicast-ethernet-tag-route-explained/, 4 pages.
Ali Sajassi et al., "IGMP and MLD Proxy for EVPN, draft-ietf-bess-evpn-igmp-mld-proxy-04", BESS Working Group, Internet Engineering Task Force (IETF), Sep. 30, 2019, 32 pages.
Disha Chopra, "EVPN Multicast", Jupiner Networks, v1, Feb. 20, 2018, 28 pages.
J. Zhang et al., "Selective Multicast in EVPN, draft-zhang-l2vpn-evpn-selective-mcast-00", Network Working Group, Internet Engineering Task Force (IETF) Oct. 21, 2013, 10 pages.

* cited by examiner

SELECTIVE MULTICAST ETHERNET TAG EXTENSION FOR OPTIMAL SOURCE DRIVEN MULTICAST FORWARDING

CROSS-REFERENCE TO RELATED APPLICATIONS

The application is continuation of U.S. application Ser. No. 16/858,978, filed Apr. 27, 2020, the entire contents of which are incorporated herein by reference.

TECHNICAL FIELD

The present disclosure relates to multicast forwarding in communication networks.

BACKGROUND

An Ethernet Virtual Private Network (EVPN) fabric is useful for multiple deployments scenario. One such scenario is distributing multicast traffic, which is often high bandwidth traffic. Optimal forwarding of multicast traffic in an EVPN fabric helps avoid any unnecessary traffic flows in the core network.

DESCRIPTION OF EXAMPLE EMBODIMENTS

Overview

Techniques are provided for use in a networking environment that includes at least a first node and a second node configured as Ethernet Virtual Private Networking (EVPN) peers of each other on an EVPN subnet that is coupled to a Layer 3 VPN over a core network. In one embodiment, a method performed by the first node comprising. The first node receives a first multicast join request from a third node (e.g., an egress node) in the core network, the first multicast join request including a source address and multicast group address of a source of a multicast stream. The first node determines that the source address and the multicast group address for the source are behind the EVPN subnet at the second node. The first node sends to the second node, a control plane join request message that includes a receiver identifier that identifies the third node as a receiver of the multicast stream, the receiver identifier enabling the second node to forward the multicast stream directly into the core network to the third node.

In another embodiment, a method is provided that is performed by the second node. The second node receives from the first node, a control plane join request message that includes the source address and the multicast group address of the source of the multicast stream and a receiver identifier that identifies the third node as a receiver of the multicast stream. The second node appends to data packets of the multicast stream, source-driven multicast routing information that causes data plane routing of the multicast stream in the core network to the third node. The second node forwards the data packets with the source-driven multicast routing information appended thereto, into the core network.

Example Embodiments

Networking systems that involve multicast forwarding have employed mechanisms by which the receiver builds a multicast tree towards the source of the multicast traffic. Other multicast tree building mechanisms involve source-based construction of the multicast tree toward the receiver. There are multiple protocols known to build a multicast tree. One such protocol is, for example, the Bit Index Explicit Replication (BIER) protocol.

The BIER protocol is a forwarding paradigm that is useful to forward and replicate multicast packets through a network. In BIER, the egress router is given an identifier, and the ingress router includes in the packets identifier(s) of the egress router(s) to which a multicast stream should be forwarded. Packets are forwarded hop-by-hop using a special header that contains the identifier and which is embedded in the packets. Routers in the network build a special forwarding table to forward/replicate packets using the BIER header. BIER allows for sending as many multicast flows as needed without having to track state in the core network that includes intervening routers/switches between the ingress and egress routers that are on the edge of the core network.

Figure 1A:
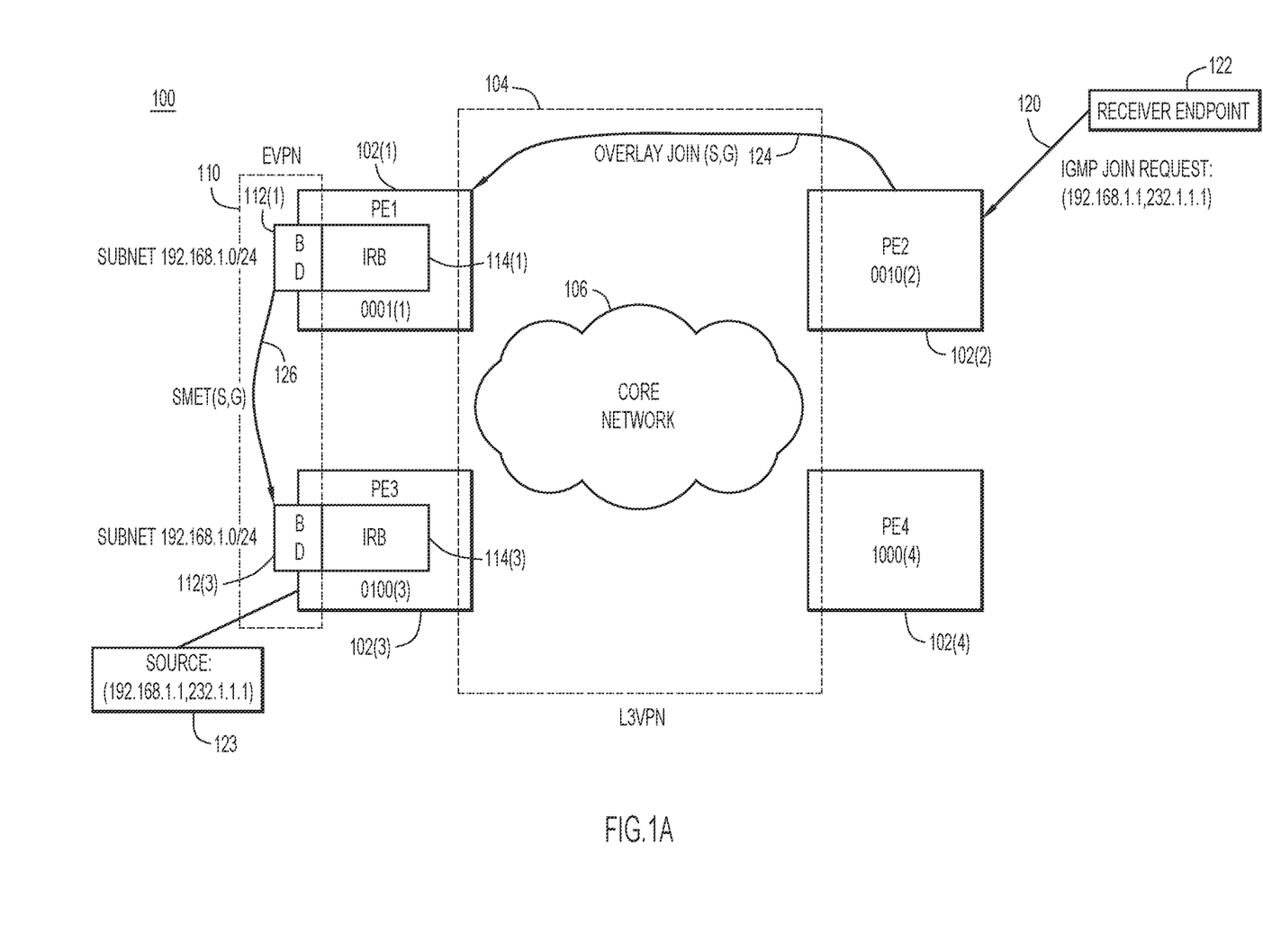
FIGS. 1A and 1B are diagrams showing existing operations in a network topology in which a multicast source is behind an Ethernet Virtual Private Networking (EVPN) fabric and receivers are behind a Layer 3 (L3) network segment.

Reference is first made to FIG. 1A. FIG. 1A illustrates an example of a network 100 in which a multicast source is behind an Ethernet Virtual Private Networking (EVPN)

fabric and receivers are behind a Layer 3 (L3) network segment. Specifically, the network 100 includes provider edge (PE) nodes 102(1), 102(2), 102(3) and 102(4), denoted PE1, PE2, PE3, and PE4, respectively. The PE nodes 102(1), 102(2), 102(3) and 102(4) are configured to communicate over a L3 Virtual Private Network (L3VPN) 104 via a L3 core network (core network) 106.

In addition, PE nodes 102(1) and 102(3) are configured as EVPN peers with each other, as shown at 110. There may be two or more PE nodes that are configured as EVPN peers in the network 100. Two EVPN peer nodes is just an example. There is a bridge domain (BD) between PE nodes 102(1) and 102(3) as shown at 112(1) and 112(3) to enable Selective Multicast Ethernet Tag (SMET) techniques. In other words, PE nodes 102(1) and 102(3) are in the same bridge domain and there is an EVPN Layer 2 (L2) extension between them and to the core network 106. Moreover, PE node 102(1) has a virtual interface, called an Integrated Router and Bridge (IRB) interface 114(1) and PE node 102(3) has an IRB interface 114(3) that enables a connection from the EVPN L2 extension to the L3 core network 106.

The IRB interfaces 114(1) and 114(3) are configured with an Internet Protocol (IP) address. Since this is a Layer 2 extension, the PE nodes 102(1) and 102(3) are on the same EVPN subnet, e.g., 192.168.1.0/24. At the Layer 3 EPVN side towards the core network 106, when the IRB interfaces 114(1) and 114(3) send reachability information, they will not send the exact host address, but instead send the prefix, e.g., 192.168.1.0/24 to indicate that the hosts in the subnet are behind PE nodes 102(1) or 102(3).

In one example, as shown in FIG. 1A, each of the PE nodes has a BIER identifier (ID), if BIER is used in the network 100. PE node 102(1) has BIER ID "0001" or bit-1, PE node 102(2) has BIER ID "0010" or bit-2, PE node 102(3) has BIER ID "0100" or bit-3 and PE node 102(4) has BIER ID "1000" or bit-4. PE node 102(2) may include in the overlay join sent at 124, its BIER ID "0010" as an egress BIER ID.

From a Layer 3 network point of view, the Layer 3 core network 106 accepts communications, e.g., multicast join requests, over the Border Gateway Protocol BGP or other protocols, such as the Interior Gateway Protocol (IGP). If PE node 102(2) needs to reach any source address behind the prefix 192.168.1.0/24, PE node 102(2) can send a request to either to PE node 102(1) or PE node 102(3).

The control plane operational flow associated with a multicast join request in the example network topology of FIG. 1A is now described.

For example, at 120, PE node 102(2) receives from a receiver endpoint 122 or other entity that is behind PE node 102(2), a multicast join request, such as an Internet Group Management Protocol (IGMP) join request, for a source 123 that is at source address 192.168.1.1 and group address 232.1.1.1. PE node 102(2) checks in a local IGMP table how to reach the source address for the multicast join request 120. Since only prefix reachability in the L3VPN network 104 is provided to avoid host route overpopulating tables in PE nodes, PE node 102(2) gets an Equal Cost Multi-Path (ECMP) path to reach this prefix (of the multicast join request). One next hop from PE node 102(2) is PE node 102(1) and the other next hop is PE node 102(3). The reason that PE node 102(2) gets an ECMP path is that there is a Layer 2 extension for the same subnet, and both of the IRBs 114(1) and 114(3) are advertising the same prefix. Individual source address reachability is not available, but rather aggregate visibility is provided, i.e., a prefix. When PE node 102(2) does a longest prefix match to the prefix of the source address of the join request, the match will point towards PE node 102(1) or PE node 102(2).

As an example, the longest prefix match that PE node 102(2) performs points to PE node 102(1). At 124, PE node 102(2) sends an overlay join request, denoted (S,G) for source address and group address of the multicast join request 120, via an L3VPN procedure, to PE node 102(1).

PE node 102(1) receives the overlay join (S,G) and determines that the requested source address is behind PE node 102(3). Using SMET techniques, at 126, PE node 102(1) sends a SMET (S,G) request to PE node 102(3) to pull the multicast traffic from PE node 102(3) since the source 123 is behind PE node 102(3). This is the control plane flow.

Figure 1B:
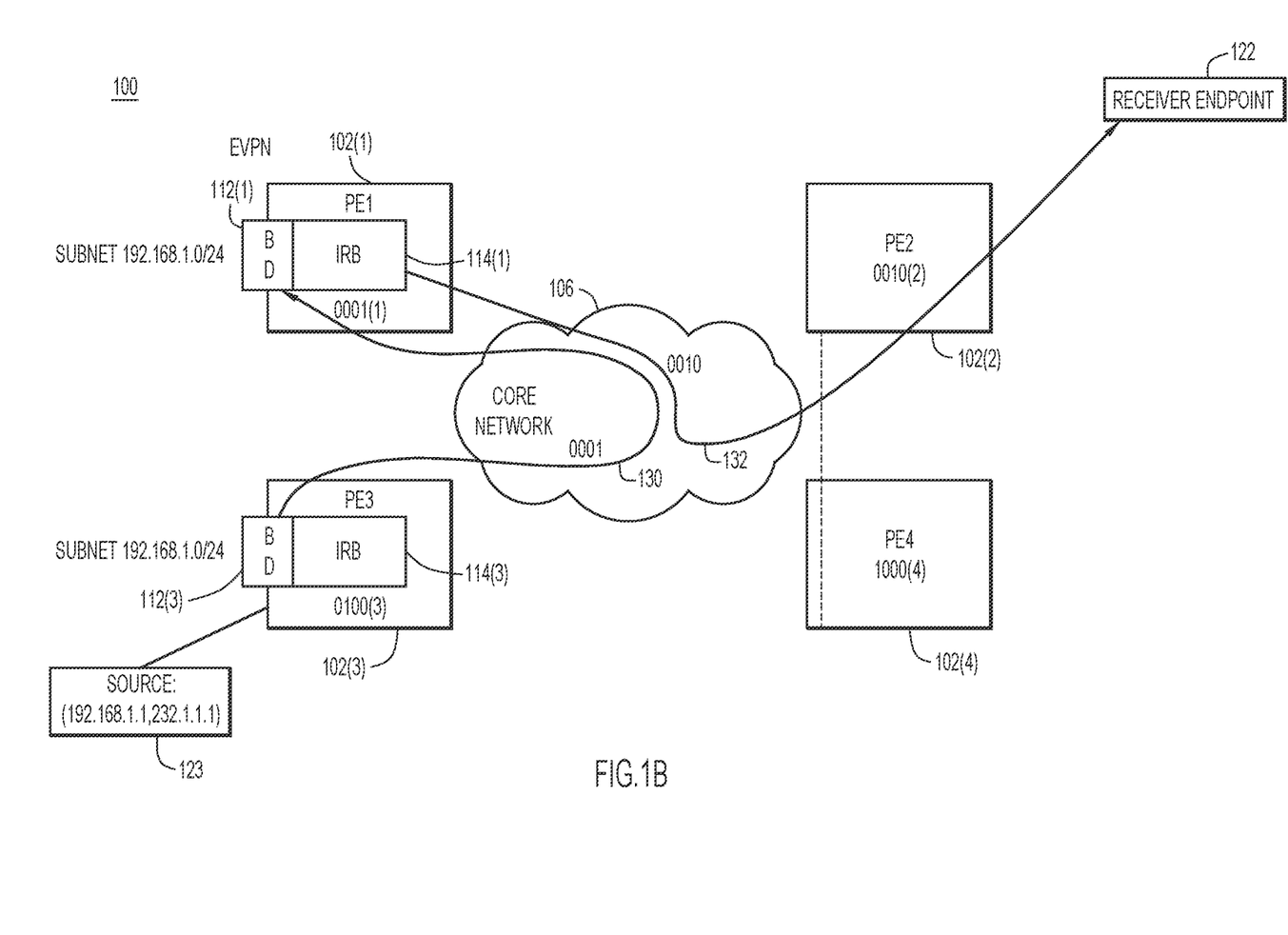

Reference is now made to FIG. 1B for a description of the data plane operational flow for the control plane scenario depicted in FIG. 1A.

At 130, PE node 102(3) sends the multicast traffic to its SMET peer, PE node 102(1). In one example in which the BIER protocol is used, PE node 102(1) does BIER encapsulation and appends to the traffic the BIER ID "0001" corresponding to PE node 102(1) when sending the multicast traffic to PE node 102(1) via core network 106. When PE node 102(1) receives the traffic, PE node 102(1) sends it to PE node 102(2), at 132, and in so doing, appends the BIER ID "0010" to the traffic when sending the multicast traffic to PE node 102(2).

As shown in FIG. 1B, the traffic passes through the core network 106 twice, once from PE node 102(3) to PE node 102(1) at 130, and then again from PE node 102(1) to PE node 102(2) at 132. This is because PE node 102(2) does not know where the source 123 is precisely located. Likewise, PE node 102(3) does not know where the actual receiver is; PE node 102(1) knows that. PE node 102(3) does not know from which entity PE node 102(1) is requesting the multicast traffic. This is the information which is missing and which causes the inefficient data plane scenario in which the traffic is sent twice through the core network 106.

There are many mechanisms by which a multicast source can determine where the traffic is to be directed. For example, BIER is a source-driven multicast technology where bits are provided at the ingress of a network, e.g., core network 106 shown in FIGS. 1A and 1B, to indicate where the traffic is to go at the egress of the core network 106. RSVP-TE is a core tree mechanism in which the ingress PE drives the tree building mechanism. In addition, controller driven multicast is a technology in which a controller builds the complete forwarding tree (for example, Tree-Segment Identifier (SID)). Common among these three mechanisms is that the source drives the multicast forwarding and delivery path to a set of (one or more) receivers. The solution presented herein uses these characteristics of source driven multicast technologies, now know or hereinafter developed, to achieve optimal forwarding of multicast traffic.

Figure 2:
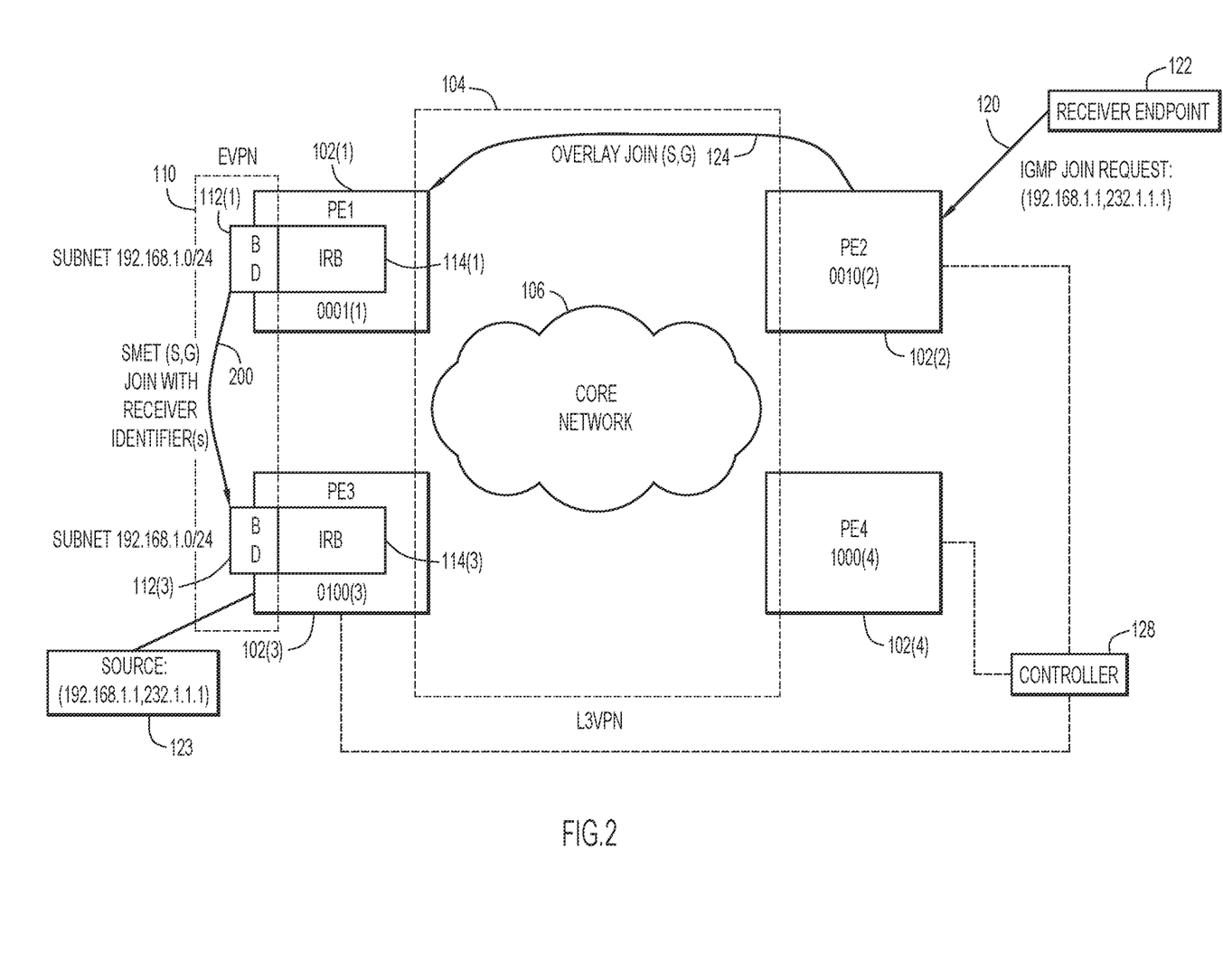
FIG. 2 is a diagram of a network topology in which a first EVPN peer is configured to send to a second EVNP peer a control plane join request message that includes information identifying the egress node associated with a multicast join request, according to an example embodiment.

Reference is now made to FIG. 2. FIG. 2 shows the network 100 of FIGS. 1A and 1B, but in which the EVPN peer nodes PE 102(1) and PE 102(3) are configured to perform operations to make the data plane routing of traffic from PE node 102(3) much more efficient. The PE node 102(2) receives the multicast join request 120 from receiver endpoint 122 and PE node 102(2) forwards the request to PE node 102(1), in the same manner as described above in connection with FIG. 1A. However, PE node 102(1) sends a control plane join request message 200, such as a SMET (S,G) join request, to PE node 102(3). The control plane join request message 200 includes one or more receiver identifier(s) of the one or more egress node(s) that requested the multicast traffic. The form and content of the receiver identifier(s) may depend on the source-driven core tree mechanism employed. For example, the receiver identifier(s) may be included as an extended community attribute of a SMET join request, and may take the form of a bitmap that identifies the PE node(s) that sent the request, such as a bitmap or bitmask formatted according to the BIER protocol, e.g., BIER ID 0010 for PE node 102(2). In other forms, the receiver identifier(s) may be edge node identifier information or a loopback address or identifier. A loopback address or identifier is a type of IP address that is used to test the communication or transportation medium on a local network card and/or for testing network applications. Data packets sent on a loopback address are re-routed back to the originating node without any alteration or modification.

FIG. 2 also shows a controller 128 that is coupled to the nodes 102(1)-102(4). The controller 128 may communication with the PE nodes 102(1)-102(4) for a variety of reasons. One such use case is where the controller 128 is configured to perform controller driven multicast by which the controller 128 builds the complete forwarding tree, as explained above.

Figure 3:
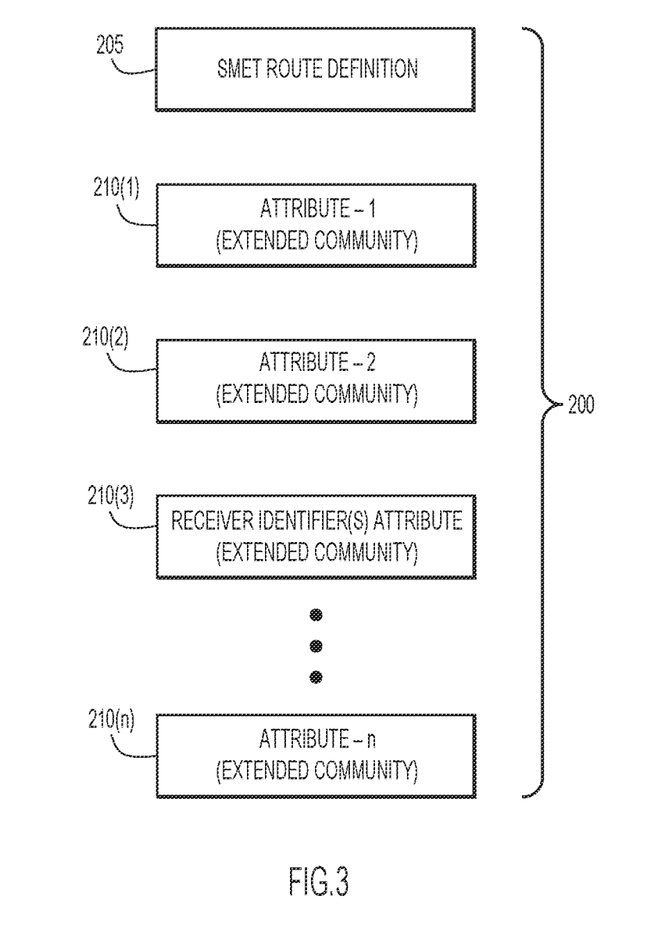
FIG. 3 is a diagram illustrating a format of the control plane join request message, according to an example embodiment.

Turning to FIG. 3, a diagram is shown of an example of the control plane join request message 200. In one example, the control plane join request message 200 includes a, such as a SMET route definition 205 defined according to draft-ietf-bess-evpn-igmp-mld-proxy-04, together with a plurality of attributes 210(1)-210(n) that are defined in extended communities, where one of these attributes, e.g., attribute 210(3), includes receiver identifier information to support the operations depicted in FIG. 2. The control plane join request message 200 shown in FIG. 3 is used to coordinate IGMP join state for a given bridge domain between PE nodes. The attribute 210(3) contains the aforementioned receiver identifier(s), that is the identifier(s) of the egress node(s) to which the multicast traffic is to be forwarded.

Figure 4:
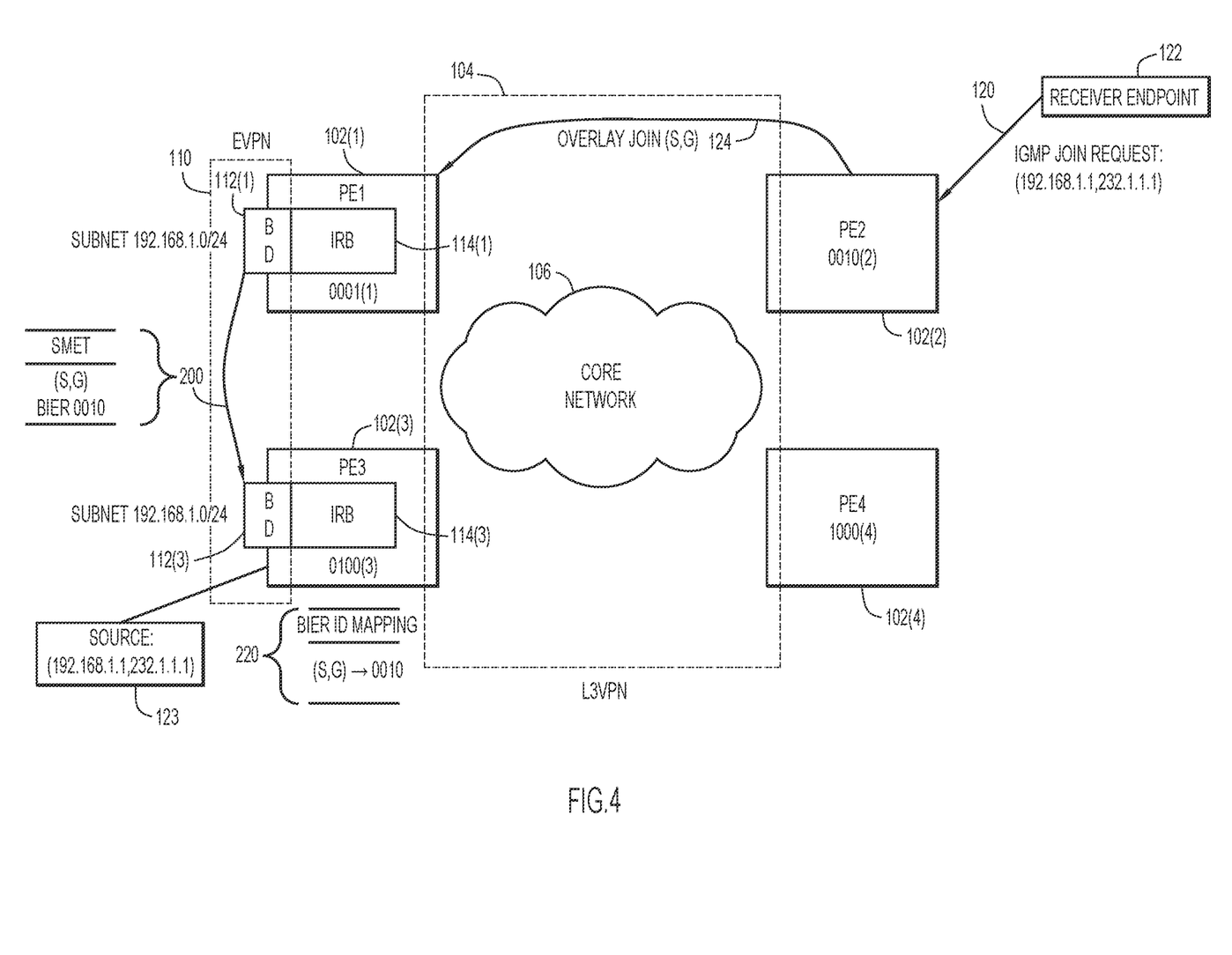
FIG. 4 is a diagram similar to FIG. 2, and illustrating on example of the information identifying the egress node in the control plane join request message, according to an example embodiment.

Reference is now made to FIG. 4. FIG. 4 shows an example use case for the operational flow of FIG. 2, where the BIER protocol is used in the core network 106. In this case, the control plane join request message 200 that PE node 102(1) sends to PE node 102(3) includes BIER bits, in an extended community field 210(3) depicted in FIG. 3, for example, for the last hop router, or egress node, e.g., identifying PE node 102(2). In the example of FIG. 4, this would be BIER ID "0010". Then, the PE node 102(3) creates an IP multicast (source address, group address) to source-driven multicast routing information mapping 220. For example, the mapping 220 indicates that the (S,G) multicast traffic is mapped to BIER ID "0010".

Figure 5:
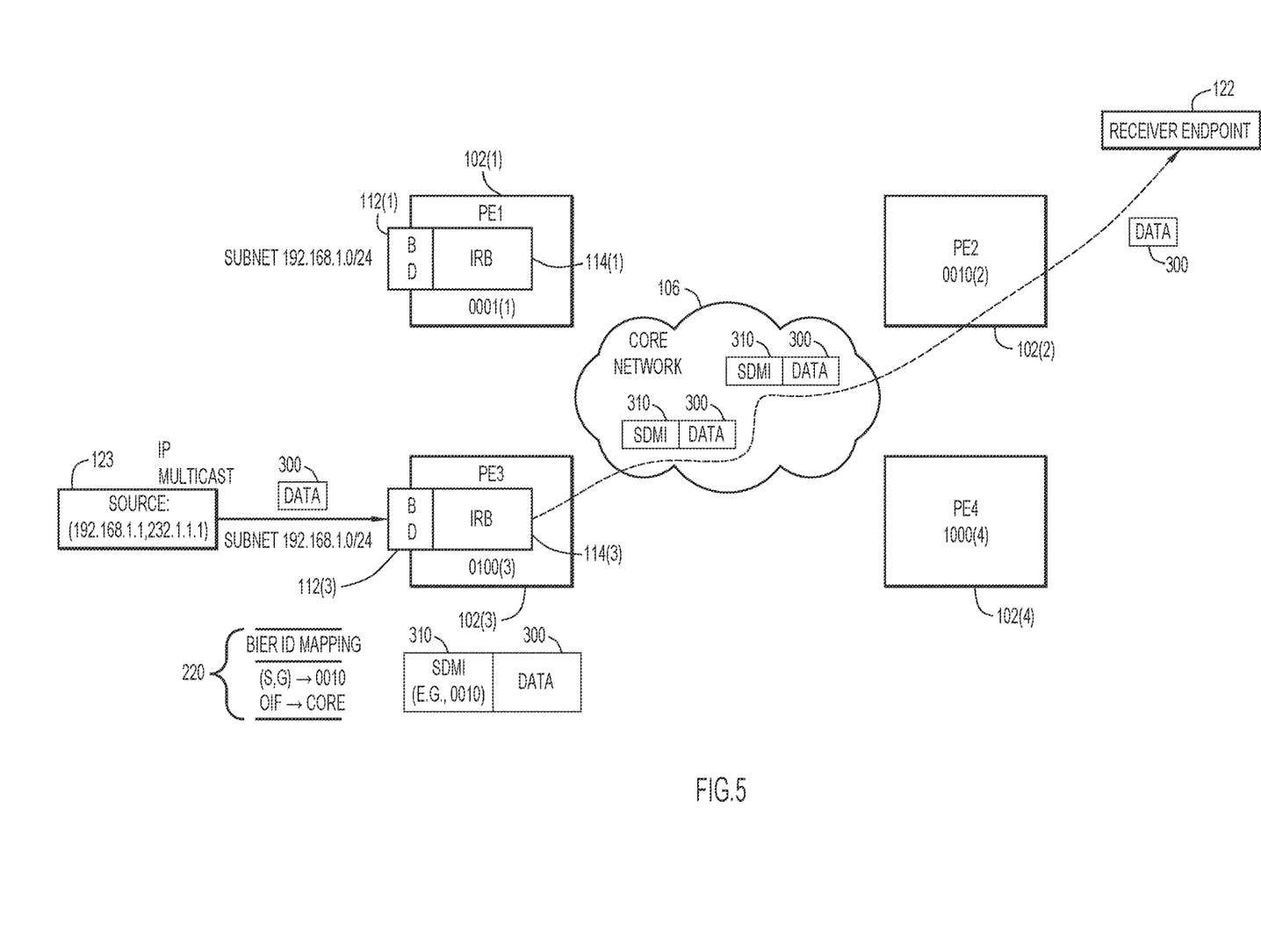
FIG. 5 is a diagram of the network topology of FIGS. 2 and 4, and showing data plane forwarding of data packets of a multicast stream using source-driven multicast routing information appended to the data packets, according to an example embodiment.

Turning now to FIG. 5, the data plane operational flow is now described. PE node 102(3) receives data packets 300 for an IP multicast stream from the source 123. The PE node 102(3) uses the IP multicast (source address, group address) to source-driven multicast routing information mapping 220 to append to the data packets 300 the source-driven multicast routing information 310 to cause data plane routing, via an outgoing interface (OIF) of PE node 102(3) to the core network 106, ultimately to the appropriate egress PE node.

Specifically, using the mapping 220, PE node 102(3) provides source-driven multicast routing information (SDMI) 310 that PE node 102(3) appends (e.g., adds a header or tag) to the data packets 300 for data plane routing of the multicast stream into the core network 106, as shown at 315 in FIG. 5. In one example, the source-driven multicast routing information 310 may take the form of a BIER ID (bitmask), which in this example, is "0010". The network entities in the core network 106 build a special forwarding table to forward/replicate the traffic using the BIER ID to the PE node 102(2), which in turn forwards the data packets 300 to the receiver endpoint 122. The packets of the multicast stream are forwarded hop-by-hop using the BIER ID, and each BIER ID is forwarded along the unicast shortest path first (SPF) path.

As clearly shown in FIG. 5, unlike the scenario depicted in FIG. 1B, the PE node 102(1) does not receive the multicast traffic from the PE node 102(3). The PE node 102(1) sends the multicast traffic directly through the core network 106 to PE node 102(2).

Figure 6:
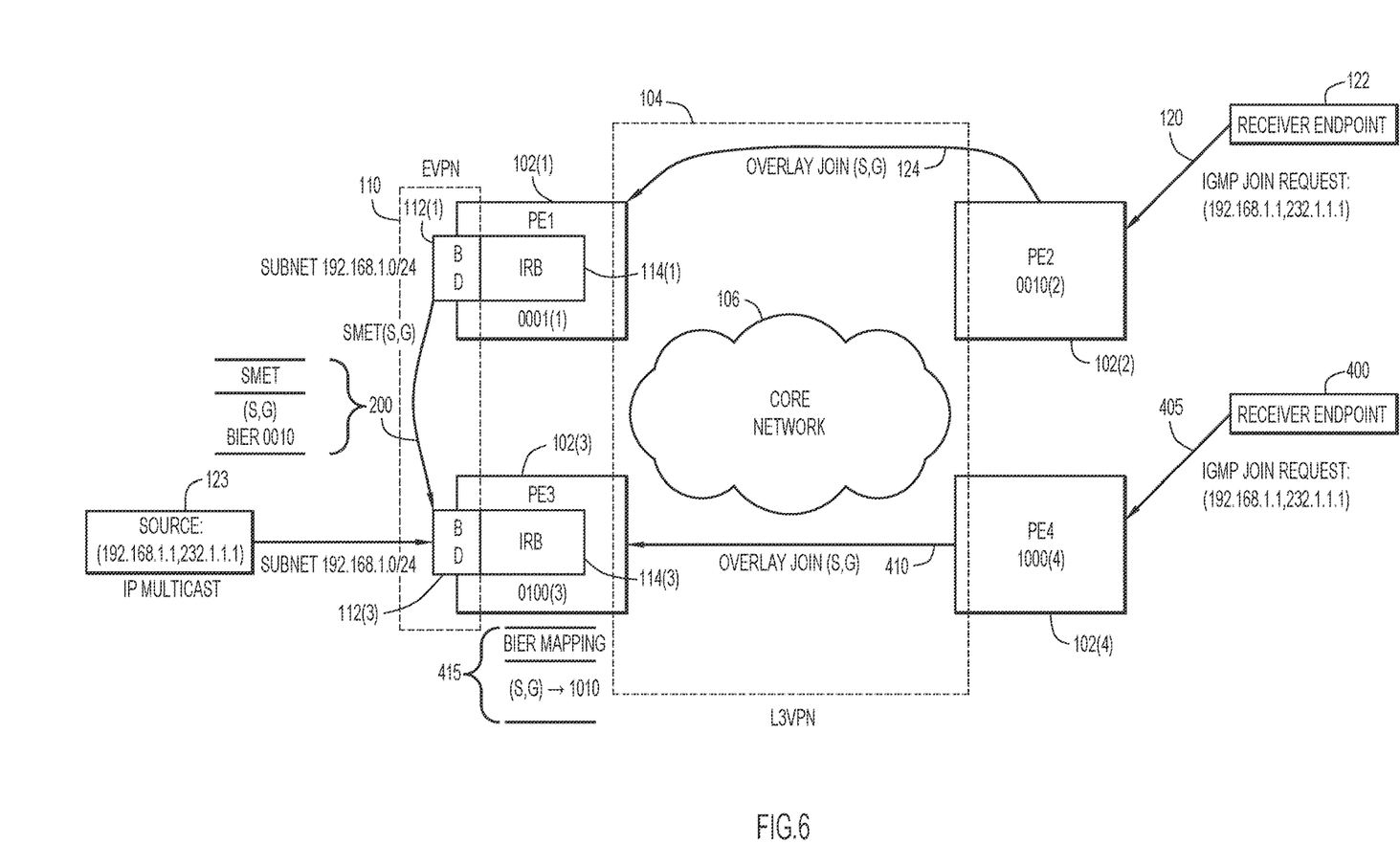
FIG. 6 is a diagram similar to FIG. 2, but showing control plane operations for different requests made to the same multicast source, according to an example embodiment.

Reference is now made to FIG. 6, which illustrates a two receiver example of the techniques depicted in FIGS. 2-5. That is, in addition to receiver endpoint 122 behind PE node 102(2) sending a multicast join request 405 for source address 192.168.1.1 and group address 232.1.1.1, another receiver endpoint 400, behind PE node 102(4), sends a multicast join request for 192.168.1.1 and group address 232.1.1.13. PE node 102(4) sends an overlay join request 410, on behalf of the join request 405, into the core network 106. The overlay join request 410 lands directly at PE node 102(3), in this example.

In the example in which the BIER protocol is used, PE node 102(3) generates a IP multicast to source-driven multicast routing information mapping 415 that indicates PE 102(2) and PE 102(4) are receivers for the multicast stream. For example, the IP multicast to source-driven multicast routing information mapping 415 is the BIER bitmask "1010".

Figure 7:
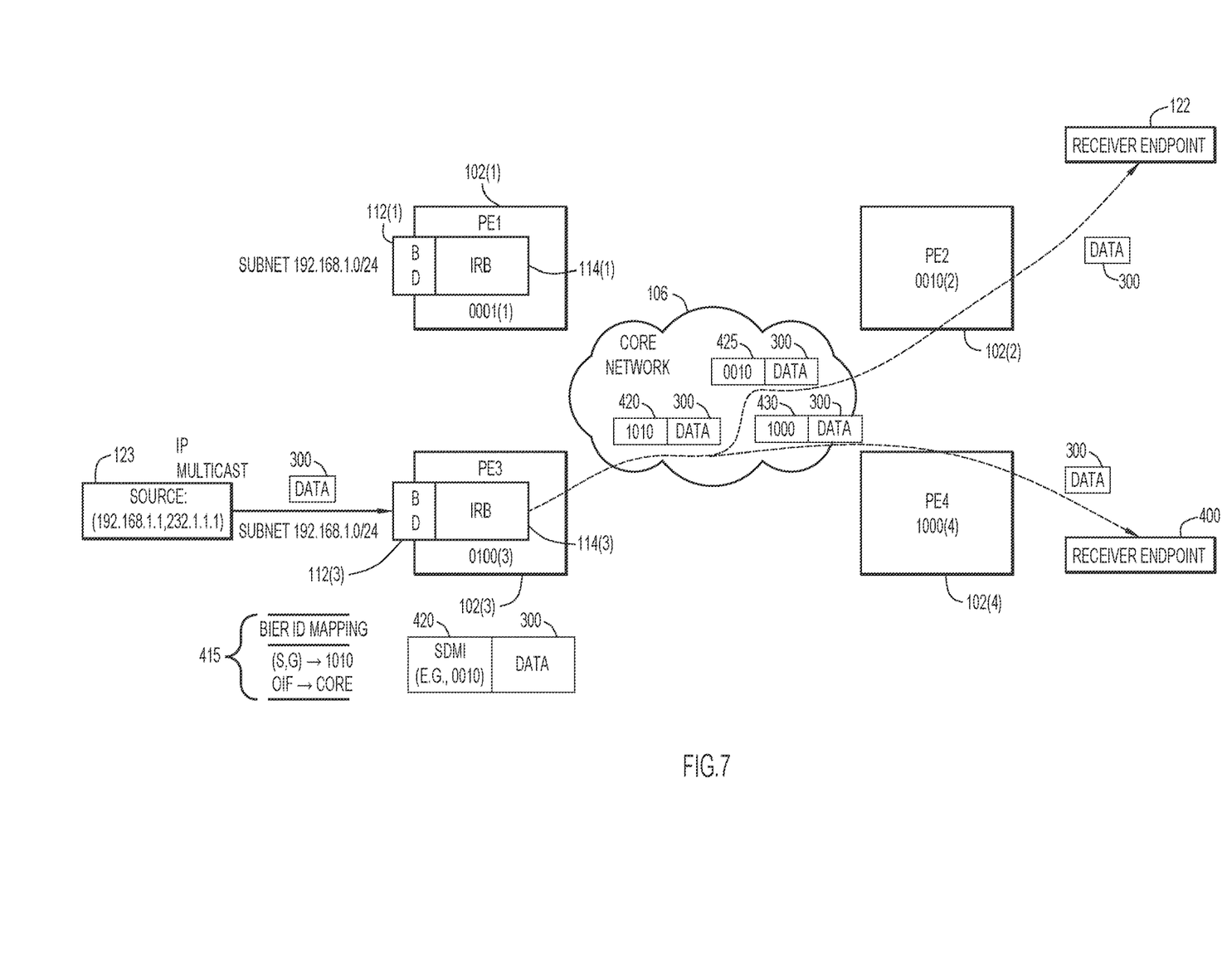
FIG. 7 is a diagram illustrating data plane operations for the scenario depicted in FIG. 6, according to an example embodiment.

FIG. 7 shows the data plane operational flow for the example of FIG. 6. The PE node 102(3) obtains from the mapping 415, a SDMI 420. In one example, SDMI is BIER bitmask "1010" to indicate that PE 102(2) and PE 102(4) are receivers of the data packets 300 of a multicast stream. PE node 102(3) appends the SDMI 420 on the data packets 300 and forwards data packets 300 with the appended SDMI 420 into core network 106 via an OIF that is coupled to core network 106. The network entities in the core network 106 interpret the BIER bitmask and forward the data packets 300 through the network, as described above in connection with FIG. 5. However, in the example of FIG. 7, the BIER bitmask "1010" is decomposed into its constituent parts at some point in the core network 106, where the data packets 300 that are sent to PE 102(2) carry the BIER ID "0010" as shown at 425 and the data packets 300 that are sent to PE 102(4) carry the BIER ID "100", as shown at 430.

Figure 8:
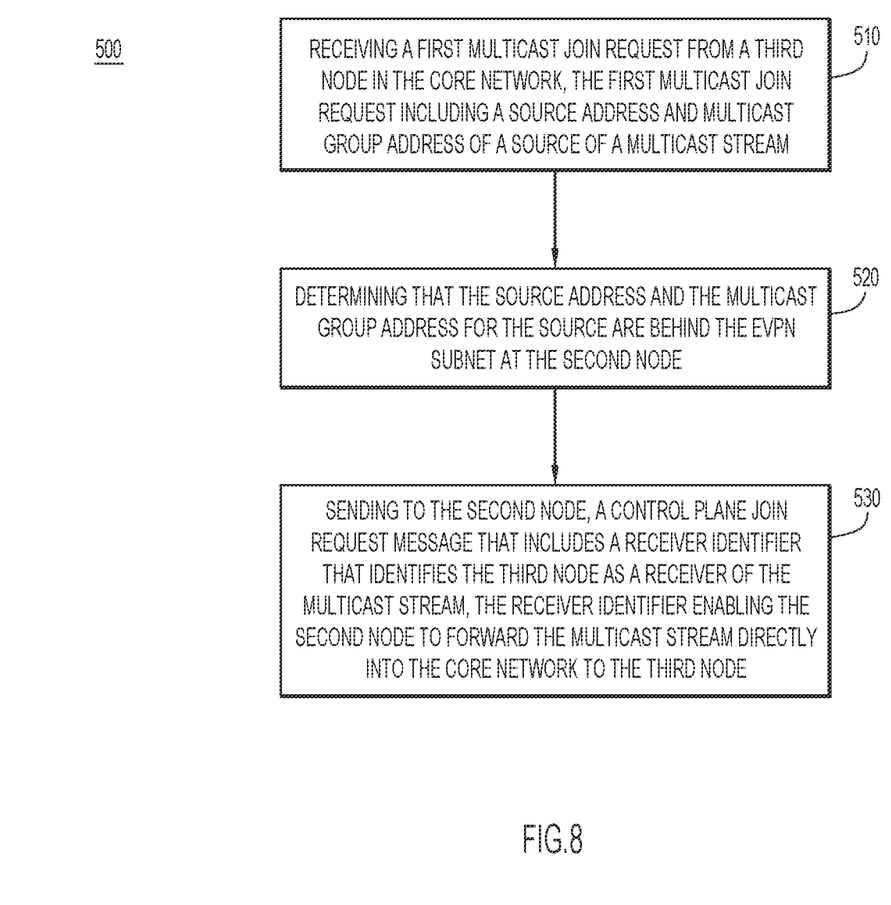
FIG. 8 is a flow chart depicting control plane operations performed by a first EVPN peer that receives a multicast join request via core network and sends a control plane join request message to a second EVPN peer where the multicast source resides, according to an example embodiment.

Reference is now made to FIG. 8. FIG. 8 illustrates a flow chart for a method 500 performed by a first node in a network environment that includes the first node and a second node, where the first node and the second node are configured as EVPN peers to each other on an EVPN subnet that is coupled to a Layer 3 VPN over a core network. Thus, method 500 depicts control plane operations performed by an EVPN peer node that receives a multicast join request for a multicast source that is not local to that EVNP peer node, but is instead behind the other EVPN peer node.

The method 500 includes, at 510, the first node receiving a first multicast join request from a third node in the core network, the first multicast join request including a source address and multicast group address of a source of a multicast stream. At 520, the method 500 includes the first node determining that the source address and the multicast group address for the source are behind the EVPN subnet at the second node. At 530, the method 500 includes the first node sending to the second node, a control plane join request message that includes a receiver identifier that identifies the third node as a receiver of the multicast stream, the receiver identifier enabling the second node to forward the multicast stream directly into the core network to the third node.

The control plane join request message that the first node sends to the second node in operation 530 may be a SMET join request. The receiver identifier may be included in an extension, attribute or extended community of the SMET join request.

The receiver identifier may be any one of: a bitmap that identifies the third node, a loopback identifier, or edge node identifier information. In one embodiment, the bitmap is formatted in accordance with the BIER protocol.

Figure 9:
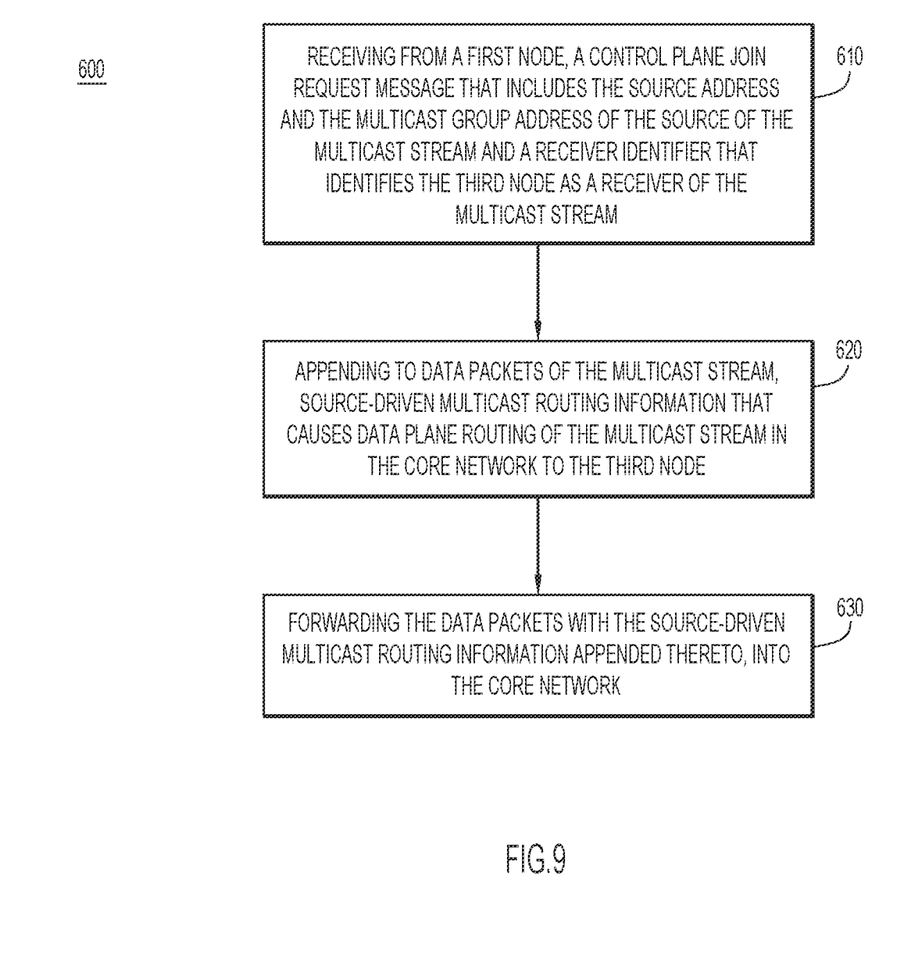
FIG. 9 is a flow chart depicting data plane operations performed by a second EVPN peer that receives a control plane join request message from a first EVPN peer, according to an example embodiment.

Turning to FIG. 9, a flow chart is shown for a method 600 performed by a second node in a network environment that includes a first node and the second node, where the first node and the second node are configured as EVPN peers to each other on an EVPN subnet that is coupled to a Layer 3 VPN over a core network. The first node has received a first multicast join request from a third node in the core network, and the first multicast join request includes a source address and multicast group address of a source of a multicast stream. Thus, the method 600 depicts the data plane operations performed by an EVPN peer node when sending multicast traffic into the core network.

The method 600 includes, at 610, the second node receiving from the first node a control plane join request message that includes a receiver identifier that identifies the third node as a receiver of the multicast stream. At 620, the method 600 includes the second node appending to data packets of the multicast stream, source-driven multicast routing information that causes data plane routing of the multicast stream in the core network to the third node. At 630, the method includes the second node forwarding the data packets with the source-driven multicast routing information appended thereto, into the core network.

The method 600 may further include generating a mapping between the source address and group address of the source to the source-driven multicast routing information. The appending operation 620 then takes the source-driven multicast routing information from this mapping to append it to data packets of the multicast stream for data plane routing in the core network to the third node.

As explained above, the source-driven multicast routing information may include any one of: a bit mask according to the Bit Index Explicit Replication protocol, a label or identifier according to the Resource Reservation Protocol-Traffic Engineering (RSVP-TE) protocol, or an identifier according to a controller-driven multicast mechanism in which a controller that is in communication with the first node and second node, builds a multicast forwarding tree. Thus, the techniques presented herein may use a label of any mechanism type to tag onto the data to indicate a single tree from the source to the receiver(s). There is no need to stitch together multiple trees that are built in the core network.

As described above in connection with FIG. 7, the source-driven multicast routing information identifies the third node and a fourth node as multicast receivers of the multicast stream and the source-driven multicast routing information is configured to cause data plane routing of the multicast stream from the second node into the core network to the third node and to the fourth node of the core network, the fourth node having sent to the first node or to the second node a second multicast join request for the multicast stream from the source.

Figure 10:
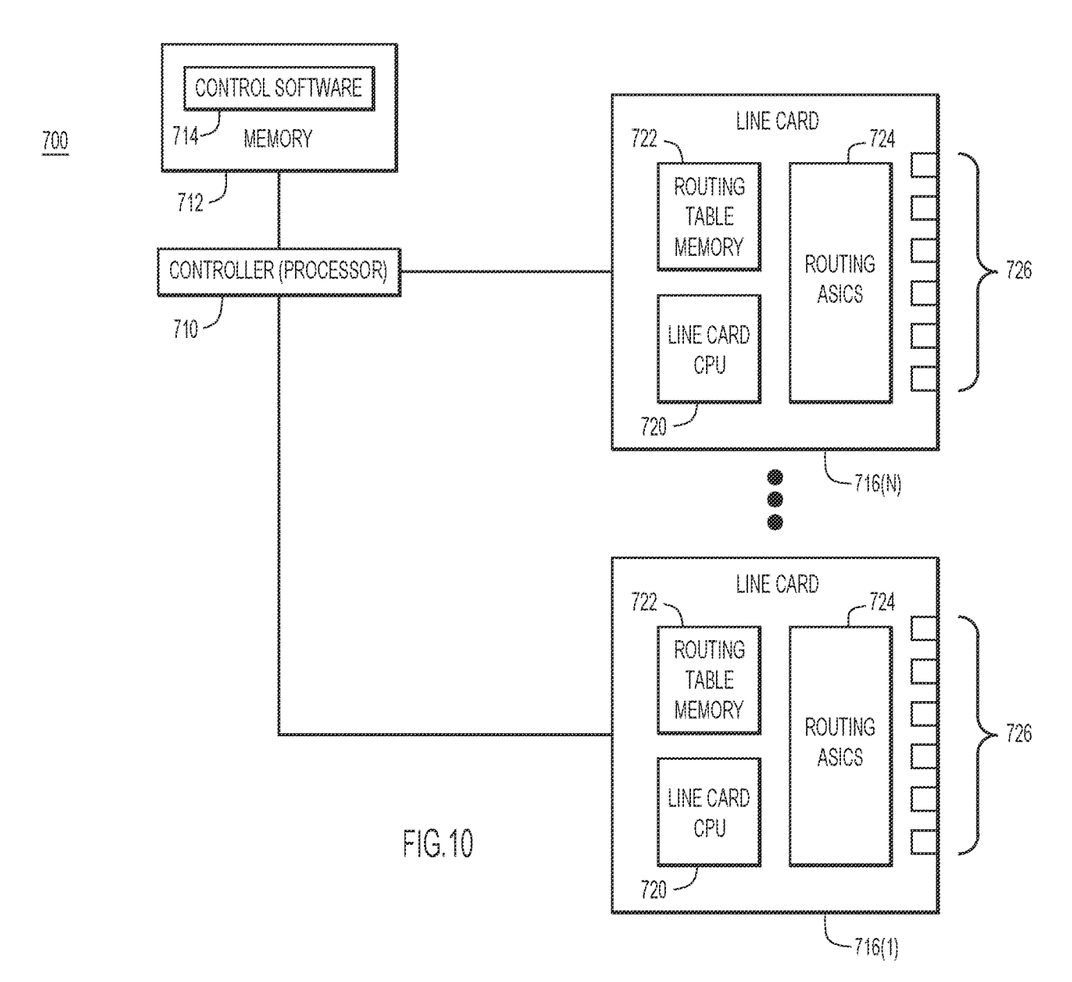
FIG. 10 is a hardware block diagram of a network device configured to perform the control plane operations and data plane operations of an EVPN peer node, according to an example embodiment.

Reference is now made to FIG. 10. FIG. 10 illustrates a block diagram of a network device 700 that may be configured to serve as either of the PE EVPN peer nodes, such as PE node 102(1) or 102(3) depicted in FIGS. 2 and 4-7. The network device 700 includes a controller 710, memory 712 that stores control software 714 for the network device 700, and a plurality of line cards 716(1)-716(N). The controller 710 may be one or more microprocessors and executes the control software 714 to perform control the network device 700.

The memory 712 may be read only memory (ROM), random access memory (RAM), magnetic disk storage media devices, optical storage media devices, flash memory devices, electrical, optical, or other physical/tangible memory storage devices. Thus, in general, the memory 712 may comprise one or more tangible (non-transitory) computer readable storage media (e.g., a memory device) encoded with software comprising computer executable instructions and when the software is executed (by the controller 710) it is operable to perform the operations described herein.

Each line card 716(1)-716(N) includes, among other components, a line card central processing unit (CPU) 720, routing table memory 722, one or more routing Application Specific Integrated Circuits (ASICs) 724 and network ports 726. The line card CPU 720 controls the respective line card and is coupled to routing table memory 722 and the routing ASICs 724. The routing table memory 722 stores routing entries used to route network traffic via network ports 726. The network ports 726 send (egress) network packets into a network and receive (ingress) network packets from a network. The routing ASICs 724 perform the routing functions among the plurality of network ports 726 based on entries in the routing table memory 722, and controls provided by the controller 710. The routing control operations that are performed by an EVPN PE node described herein may be performed by the controller 710 or by the line card CPU 720, or the routing ASICs 724 in one or more of the line cards 716(1)-716(N).

The control software 714 may include software instructions that, when executed by the controller 710, cause the controller 710 to configure one or more of the line cards 716(1)-716(N) to perform the control plane and/or data plane operations of an EVN peer node described above in connection with FIGS. 2-9.

[ow] The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the test module, the network device, the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language, Python or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one embodiment, a method is provided for use in a networking environment that includes at least a first node and a second node configured as Ethernet Virtual Private Networking (EVPN) peers of each other on an EVPN subnet that is coupled to a Layer 3 VPN over a core network, the method performed by the first node and comprising: receiving a first multicast join request from a third node in the core network, the first multicast join request including a source address and multicast group address of a source of a multicast stream; determining that the source address and the multicast group address for the source are behind the EVPN subnet at the second node; and sending to the second node, a control plane join request message that includes a receiver identifier that identifies the third node as a receiver of the multicast stream, the receiver identifier enabling the second node to forward the multicast stream directly into the core network to the third node.

In another form, a method is provided for use in a networking environment that includes at least a first node and a second node configured as Ethernet Virtual Private Networking (EVPN) peers of each other on an EVPN subnet that is coupled to a Layer 3 VPN over a core network, the first node having received a first multicast join request from a third node in the core network, the first multicast join request including a source address and multicast group address of a source of a multicast stream, the method performed by the second node and comprising: receiving from the first node, a control plane join request message that includes the source address and the multicast group address of the source of the multicast stream and a receiver identifier that identifies the third node as a receiver of the multicast stream; appending to data packets of the multicast stream, source-driven multicast routing information that causes data plane routing of the multicast stream in the core network to the third node; and forwarding the data packets with the source-driven multicast routing information appended thereto, into the core network.

In another form, a system is provided comprising at least a first node and a second node configured as Ethernet Virtual Private Networking (EVPN) peers of each other on an EVPN subnet that is coupled to a Layer 3 VPN over a core network; the first node is configured to: receive a first multicast join request from a third node in the core network, the first multicast join request including a source address and multicast group address of a source of a multicast stream; determine that the source address and the multicast group address for the source are behind the EVPN subnet at the second node; and send to the second node, a control plane join request message that includes a receiver identifier that identifies the third node as a receiver of the multicast stream, the receiver identifier enabling the second node to forward the multicast stream directly into the core network to the third node; the second node is configured to: receive the control plane join request message; append to data packets of the multicast stream, source-driven multicast routing information that causes data plane routing of the multicast stream in the core network to the third node; and forward the data packets with the source-driven multicast routing information appended thereto, into the core network.

In yet another form, an apparatus that is to serve as a first node among at least first and second nodes that are configured as Ethernet Virtual Private Networking (EVPN) peers of each other on an EVPN subnet that is coupled to a Layer 3 VPN over a core network, the apparatus comprising a plurality of network ports and a controller, wherein the controller is configured to: obtain a first multicast join request received from a third node in the core network, the first multicast join request including a source address and multicast group address of a source of a multicast stream; determine that the source address and the multicast group address for the source are behind the EVPN subnet at the second node; and generate a control plane join request message to be sent to the second node, the control plane join request message including a receiver identifier that identifies the third node as a receiver of the multicast stream, the receiver identifier enabling the second node to forward the multicast stream directly into the core network to the third node.

In yet another form, an apparatus is provided that is to serve as a second node among at least first and second nodes that are configured as Ethernet Virtual Private Networking (EVPN) peers of each other on an EVPN subnet that is coupled to a Layer 3 VPN over a core network, the first node having received a first multicast join request from a third node in the core network, the first multicast join request including a source address and multicast group address of a source of a multicast stream, the apparatus comprising: a plurality of network ports and a controller, wherein the controller is configured to: obtain a control plane join request message received from the first node, the control plane join request message including the source address and the multicast group address of the source of the multicast stream and a receiver identifier that identifies the third node as a receiver of the multicast stream; append to data packets of the multicast stream, source-driven multicast routing information that causes data plane routing of the multicast stream in the core network to the third node; and cause the data packets with the source-driven multicast routing information appended thereto to be forwarded into the core network.

In still another form, one or more non-transitory computer readable storage media are provided, encoded with instructions that, when executed by a processor of a network device that serves as a first node among at least first and second nodes that are configured as Ethernet Virtual Private Networking (EVPN) peers of each other on an EVPN subnet that is coupled to a Layer 3 VPN over a core network, cause the processor to perform operations including: receiving a first multicast join request from a third node in the core network, the first multicast join request including a source address and multicast group address of a source of a multicast stream; determining that the source address and the multicast group address for the source are behind the EVPN subnet at the second node; and sending to the second node, a control plane join request message that includes a receiver identifier that identifies the third node as a receiver of the multicast stream, the receiver identifier enabling the second node to forward the multicast stream directly into the core network to the third node.

In yet another form, one or more non-transitory computer readable storage media are provided, encoded with instructions that, when executed by a processor of a network device that serves as a second node among at least first and second nodes that are configured as Ethernet Virtual Private Networking (EVPN) peers of each other on an EVPN subnet that is coupled to a Layer 3 VPN over a core network, the first node having received a first multicast join request from a third node in the core network, the first multicast join request including a source address and multicast group address of a source of a multicast stream, cause the processor to perform operations including: receiving from the first node, a control plane join request message that includes the source address and the multicast group address of the source of the multicast stream and a receiver identifier that identifies the third node as a receiver of the multicast stream; appending to data packets of the multicast stream, source-driven multicast routing information that causes data plane routing of the multicast stream in the core network to the third node; and forwarding the data packets with the source-driven multicast routing information appended thereto, into the core network.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. In a networking environment that includes at least a first node and a second node configured as Ethernet Virtual Private Networking (EVPN) peers of each other on an EVPN subnet across a core network, a method performed by the first node comprising:
   receiving a multicast join request from a receiver endpoint, the multicast join request including a source address and a multicast group address of a source of a multicast stream;
   constructing a Selective Multicast Ethernet Tag (SMET) EVPN control plane message, the SMET EVPN control plane message including an Internet Group Management Protocol (IGMP) membership report corresponding to the multicast join request and a receiver identifier corresponding to a second node; and
   transmitting the SMET EVPN control plane message to a third node.

2. The method of claim 1, wherein the SMET EVPN control plane message includes a route definition and wherein the receiver identifier is included in an attribute or an extension of the SMET EVPN control plane message.

3. The method of claim 1, wherein the receiver identifier is a bitmap or bitmask formatted according to the Bit Index Explicit Replication (BIER) protocol.

4. In a networking environment that includes at least a first node and a second node configured as Ethernet Virtual Private Networking (EVPN) peers of each other on an EVPN subnet that is coupled to a Layer 3 VPN over a core network, a method performed by the first node comprising:
   receiving an advertisement of a multicast stream available from a first multicast source;
   receiving a Selective Multicast Ethernet Tag (SMET) EVPN control plane message, the SMET EVPN control plane message including an Internet Group Management Protocol (IGMP) membership report identifying a first multicast receiver endpoint for the first multicast source, and an attribute or extension including a receiver identifier corresponding to the second node; and
   forwarding the multicast stream directly into the core network to the second node.

5. The method of claim 4, wherein the receiver identifier is a bitmap or bitmask formatted according to the Bit Index Explicit Replication (BIER) protocol.

6. The method of claim 1, further comprising, at the third node:
   appending to data packets of the multicast stream, source-driven multicast routing information that causes data plane routing of the multicast stream in the core network to the second node; and
   forwarding the data packets with the source-driven multicast routing information appended thereto, into the core network.

7. The method of claim 6, further comprising, at the third node:
   generating a mapping between the source address and group address of the source to the source-driven multicast routing information.

8. The method of claim 6, further comprising receiving the multicast stream at the second node without the multicast stream transiting the first node.

9. A system comprising at least a first node, a second node, and a third node configured as Ethernet Virtual Private Networking (EVPN) peers of each other on an EVPN subnet across a core network, wherein the first node is configured to:
   receive a multicast join request from a receiver endpoint, the multicast join request including a source address and a multicast group address of a source of a multicast stream;
   construct a Selective Multicast Ethernet Tag (SMET) EVPN control plane message, the SMET EVPN control plane message including an IGMP membership report corresponding to the multicast join request and a receiver identifier corresponding to a second node; and
   transmit the SMET EVPN control plane message to a third node.

10. The system of claim 9, wherein the SMET EVPN control plane message includes a route definition and wherein the receiver identifier is included in an attribute or an extension of the SMET EVPN control plane message.

11. The system of claim 9, wherein the receiver identifier is a bitmap or bitmask formatted according to the Bit Index Explicit Replication (BIER) protocol.

12. The system of claim 9, wherein the third node is configured to:
   append to data packets of the multicast stream, source-driven multicast routing information that causes data plane routing of the multicast stream in the core network to the second node; and
   forward the data packets with the source-driven multicast routing information appended thereto, into the core network.

13. The system of claim 12, wherein the third node is further configured to:
   generate a mapping between the source address and group address of the source to the source-driven multicast routing information.

14. The system of claim 12, wherein the second node receives the multicast stream at the second node without the multicast stream transiting the first node.

15. A system comprising at least a first node and a second node configured as Ethernet Virtual Private Networking (EVPN) peers of each other on an EVPN subnet across a core network, wherein the first node is configured to:
   receive an advertisement of a multicast stream available from a first multicast source;
   receive a Selective Multicast Ethernet Tag (SMET) EVPN control plane message, the SMET EVPN control plane message including an IGMP membership report identifying a first multicast receiver endpoint for the first multicast source and an attribute or extension identifying including receiver identifier corresponding to the second node; and
   forward the multicast stream directly into the core network to the second node.

16. The system of claim 15, wherein receiver identifier is a bitmap or bitmask formatted according to the Bit Index Explicit Replication (BIER) protocol.

* * * * *